US010063919B2

United States Patent
Kelly

(10) Patent No.: US 10,063,919 B2
(45) Date of Patent: Aug. 28, 2018

(54) DIGITAL MEDIA RECEIVER MONITORING SYSTEM

(71) Applicant: Circle Computer Resources, Inc., Cedar Rapids, IA (US)

(72) Inventor: Phillip Edgar Kelly, Cedar Rapids, IA (US)

(73) Assignee: Circle Computer Resources, Inc., Cedar Rapids, IA (US)

( * ) Notice: Subject to any disclaimer, the term of this patent is extended or adjusted under 35 U.S.C. 154(b) by 28 days.

(21) Appl. No.: 14/738,151

(22) Filed: Jun. 12, 2015

(65) Prior Publication Data

US 2016/0366477 A1 Dec. 15, 2016

(51) Int. Cl.
| | |
|---|---|
| *H04N 21/442* | (2011.01) |
| *H04N 21/258* | (2011.01) |
| *H04N 21/434* | (2011.01) |
| *H04N 21/4425* | (2011.01) |
| *H04N 21/61* | (2011.01) |
| *H04N 21/6543* | (2011.01) |
| *H04N 21/658* | (2011.01) |

(52) U.S. Cl.
CPC . *H04N 21/44209* (2013.01); *H04N 21/25808* (2013.01); *H04N 21/4345* (2013.01); *H04N 21/4425* (2013.01); *H04N 21/6118* (2013.01); *H04N 21/6168* (2013.01); *H04N 21/6543* (2013.01); *H04N 21/6582* (2013.01)

(58) Field of Classification Search
CPC .. H04N 21/44008; H04H 20/14; H04H 60/31; H04H 60/37; H04H 60/40
See application file for complete search history.

(56) References Cited

U.S. PATENT DOCUMENTS

| | | | |
|---|---|---|---|
| 9,100,705 B2* | 8/2015 | Jones | H04N 21/47217 |
| 2001/0018742 A1* | 8/2001 | Hirai | G06F 21/10 |
| | | | 713/193 |

(Continued)

*Primary Examiner* — Alexander Q Huerta
(74) *Attorney, Agent, or Firm* — Shuttleworth & Ingersoll, PLC; Jason Sytsma

(57) ABSTRACT

The invention provides a method for monitoring a digital media receiver (including receivers for television or other type of digital media) to determine whether it is necessary for a receiver to re-connect in order to continue receiving a predetermined channel or stream. This invention is useful in digital media monitoring systems and in situations with many receivers connected to the same signal source and predetermined channels defined to be output by each receiver. One embodiment of the invention uses an auditing receiver that constantly scans the upstream channel-map, guide data, service information or system information to determine if the connection parameters required for receiving each predetermined stream have changed. Some examples of connection parameters include packet identifiers (PIDs), radio frequency (RF) channel and uniform resource locator (URL), depending on the type of broadcast and stream. When the auditing receiver gathers the latest connection parameters, a monitoring system compares the recently checked connection parameters to the connection parameters currently in use on each other receiver to determine if each receiver needs to be re-connected to continue receiving the predetermined stream defined for that receiver.

26 Claims, 3 Drawing Sheets

(56) References Cited

U.S. PATENT DOCUMENTS

| | | | |
|---|---|---|---|
| 2004/0163127 A1* | 8/2004 | Karaoguz | H04L 12/2803 |
| | | | 725/120 |
| 2005/0091699 A1* | 4/2005 | Poli | G06F 8/61 |
| | | | 725/132 |
| 2006/0184624 A1* | 8/2006 | Thukral | H04N 7/15 |
| | | | 709/204 |
| 2007/0186259 A1* | 8/2007 | Pedlow | H04N 5/50 |
| | | | 725/120 |
| 2009/0025038 A1* | 1/2009 | Sahasrabudhe | H04N 5/50 |
| | | | 725/50 |
| 2009/0158349 A1* | 6/2009 | Song | H04N 7/17318 |
| | | | 725/54 |
| 2009/0165050 A1* | 6/2009 | Lee | H04N 21/235 |
| | | | 725/39 |
| 2009/0183206 A1* | 7/2009 | Lee | H04N 5/50 |
| | | | 725/56 |
| 2010/0169919 A1* | 7/2010 | Du Breuil | H04N 5/50 |
| | | | 725/39 |
| 2012/0215542 A1* | 8/2012 | Schroeter | H04M 1/72522 |
| | | | 704/270.1 |
| 2012/0265875 A1* | 10/2012 | Moran | H04L 41/0253 |
| | | | 709/224 |
| 2013/0055333 A1* | 2/2013 | Kummer | H04N 21/4334 |
| | | | 725/134 |
| 2013/0166901 A1* | 6/2013 | Kim | G06F 9/44505 |
| | | | 713/100 |
| 2014/0013342 A1* | 1/2014 | Swan | H04N 21/47217 |
| | | | 725/5 |
| 2015/0181269 A1* | 6/2015 | McMillan | H04N 21/2668 |
| | | | 725/19 |

* cited by examiner

DIGITAL MEDIA RECEIVER MONITORING SYSTEM

CROSS-REFERENCES TO RELATED APPLICATIONS

This application claims the benefit of provisional patent application Ser. No. 62/069,412, filed Oct. 28, 2014 by the present inventor.

BACKGROUND OF THE INVENTION

1. Field of the Invention

This invention relates to the field of digital media content monitoring. More specifically, the invention comprises a way to detect connection parameter changes in a broadcast and uses this information to correct digital media receivers when a predetermined channel or stream has a lineup change.

2. Description of the Related Art

There are many ways in which the contents of digital media streams are monitored. For the purposes of this invention, content monitoring refers to the contents of a digital media stream which include one or more of the following: audio, video, digital metadata, and subtitle/closed caption. Frequently content monitoring is done on television programming. Some of the reasons this content is monitored include:
  Automatic Content Recognition (ACR)—This technology is commonly subcategorized as "watermarking" or "fingerprinting" technology. Watermarking techniques change the audio or video in a stream before it is broadcasted by putting a unique, hidden "watermark" on it which can be recognized by computers later. Fingerprinting techniques process audio or video to generate unique reference "fingerprints" without changing the data. Each fingerprint is based on the unique audio, video, subtitles, caption or metadata in the stream so that other copies of this data can be recognized by software referencing these fingerprints later. ACR technology is used for:
  Rights management (confirming that a TV station is paying the royalties for the content it displays, etc.).
  Software Applications on Smart TVs, tablets, smartphones and other devices—these applications can detect what content is playing and allow an interactive experience. For example: users can vote or play trivia games that are related and synced to the content as it is broadcast.
  TV Ratings—watermarks on audio or video are read to confirm that a program that aired is the same as the scheduled program. Also, some programs have "fingerprints" taken to offer an alternate system to reading watermarks.
  Advertisement verification—Counting the number of occurrences with time stamps when an advertisement is played. This allows a TV or radio station to prove that advertisements were aired. It also allows advertisers to audit TV or radio stations and verify that purchased advertisements ran.
  Broadcast Monitoring—This technology usually consists of recording content, usually for public relations purposes. For example, if a touring politician wants to know what the local news said about him, he may query a broadcast monitoring database to find transcripts and audio/video clips. Similarly, an organization's public relations department may want to know what news stories have been reported about them recently and do a similar search.

These and other applications have created a demand for content monitoring systems. Content monitoring, especially in cable TV, comes with many challenges. Most cable providers prefer that provider owned receivers are rented as opposed to allowing users to provide user owned hardware. It is well known in this industry that most cable TV receivers are highly unreliable when running constantly. This causes high maintenance costs and excessive down time. Cable TV providers commonly cause problems with cable TV receivers by changing the channel lineup. When this occurs the receiver needs to be manually re-tuned to locate the updated broadcast. Because of these reliability problems with cable TV receivers, there is demand for a reliable system that can hand off cable TV data to monitoring servers. Note that currently satellite and over-the-air, signals and receivers are usually more reliable than cable signals and receivers and are more popular when they can be used. Cable providers are required by the Federal Communications Commission (FCC) to allow end users to rent cablecards and insert them into end user owned receivers that support cablecard. This allows cable TV users to make their own receivers work with the cable TV provider's system. Some cablecard devices allow for remote management by users which allows monitoring and remote management of these receivers when they are used for content monitoring.

BRIEF SUMMARY OF THE PRESENT INVENTION

One embodiment of the invention comprises a system for monitoring and automatically correcting cable TV receivers that are meant to play a specific channel continuously for long periods of time. Furthermore, the system is meant to detect cable TV provider lineup changes and correct cable TV monitoring receivers automatically. This embodiment works when the cable TV receivers have a means for external communication (usually this comprises a connection to the internet through a separate network interface on the receiver).

In a typical cable TV content monitoring configuration, there are several receivers, each set to a channel that is being monitored. Also, there is one or more servers ingesting the output from the receivers. These receivers will be referred to as the "active receivers" in this document. For the purpose of the receiver monitoring system, there is one extra receiver that is not used for content monitoring which will be referred to as the "auditing receiver" in this document. The auditing receiver runs on a schedule and connects to each channel that an active receiver is set to, in sequence. The auditing receiver connects to the provider's connection parameter data source which is a virtual channel map obtained from the service information which is passed from a cablecard. The auditing receiver uses this data to determine the radio frequency (RF) channel and packet identifiers (PIDs) of each stream associated with the requested channel. Each time the auditing receiver is set to an active receiver's channel, it stores the connection parameters (RF channel and PIDs for each of the streams it is passing through out of the transport stream multiplex). The monitoring system then reads the connection parameters from the auditing receiver and stores them in a database. The monitoring system then connects to each active receiver and verifies that the connection parameters currently selected are the same as the connection parameters that the auditing receiver most recently found by connecting to the channel based on the latest information from the virtual channel map. If the connection parameters do not match, the monitoring system sends a command to the active receiver to re-connect based on the latest connection parameters from the virtual channel map. Although this embodiment is described in a cable TV monitoring configuration, the same method can be applied to receiving digital media streams from other sources that have upstream service information, system information, channel map or guide information available. In non-cable connections, the parameters provided by the connection parameter data source may be different but the logic for determining if a re-connection is needed would be the same: if critical parameters change, then re-connecting is required.

In a second embodiment, the monitoring software is housed on the active receivers. The active receivers receive signal from a cable TV service or other upstream digital media sources. Instead of the external monitoring system determining when to re-connect or re-tune, software on each active receiver checks the service information (or other form of channel map, guide or system information) to determine if lineup changes have occurred and re-connect with new parameters if necessary.

In a third embodiment, the monitoring software is again housed on the monitoring server and the auditing receiver is unnecessary because the monitoring server takes over the auditing function by connecting directly to the digital media stream provider's connection parameter data source to collect the latest connection parameters. The monitoring server again connects to the active receivers to determine if lineup changes have occurred and command active receiver to re-connect if necessary.

Figure 1:
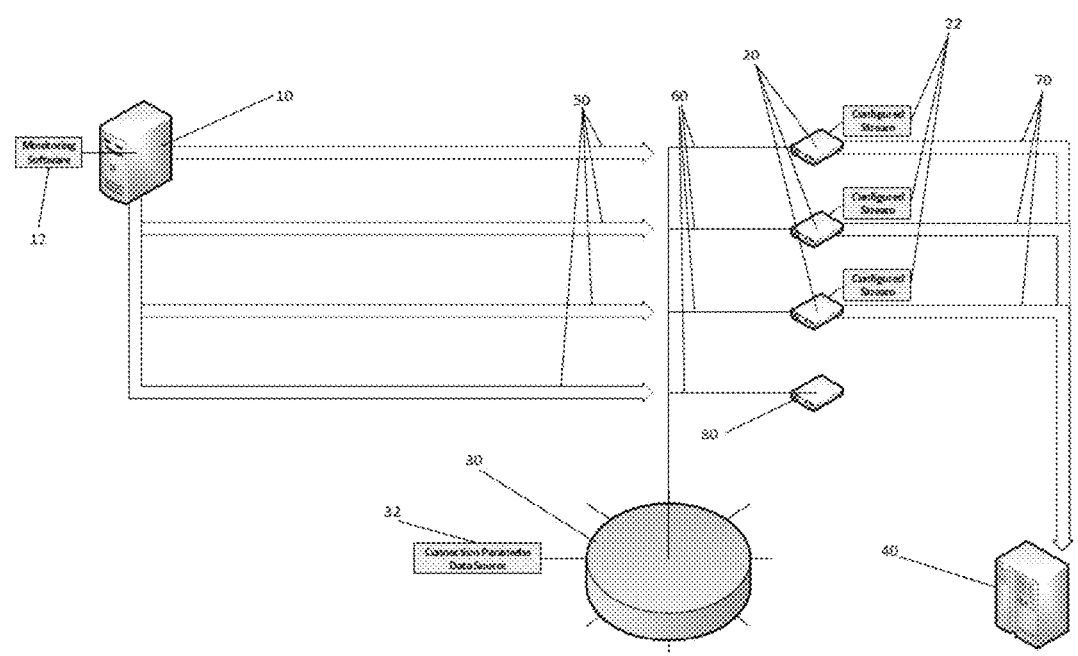
FIG. 1 illustrates the overall operation of the first mentioned embodiment of the digital media receiver monitoring system.

| REFERENCE NUMERALS IN THE DRAWINGS |
|---|
| 10 Server for Receiver Monitoring |
| 12 Monitoring Software |
| 20 Active Receiver |
| 22 Configured Stream |
| 30 Digital Media Source |
| 32 Connection Parameter Data Source |
| 40 Content Monitoring Server |
| 50 Data Connection |
| 60 Digital Media Input |
| 70 Output Medium |
| 80 Auditing Receiver |

DETAILED DESCRIPTION—FIGS. 1,2,3

FIG. 1 shows the overall function of one embodiment of the digital media receiver monitoring system. Digital media source 30 connects through digital media input 60 to active receivers 20 and auditing receiver 80. Digital media source 30 sends connection parameters from connection parameter data source 32 along with digital media streams. Active receivers 20 receive digital media streams and connect to the configured stream 22 using data from connection parameter data source 32 then output content on output medium 70 to content monitoring server 40. Monitoring software 12 runs on server for receiver monitoring 10 and connects to auditing receiver 80 through data connection 50. Auditing receiver checks current connection parameters from connection parameter data source 32 for each configured stream 22 configured on an active receiver 20 and reports connection parameters to monitoring software 12. Monitoring software 12 then checks active receivers 20 in sequence to confirm that the connection parameters currently in use are the same as the latest connection parameters gathered from auditing receiver 80. If parameters do not match, monitoring software 12 commands active receiver 20 to re-connect.

Figure 2:
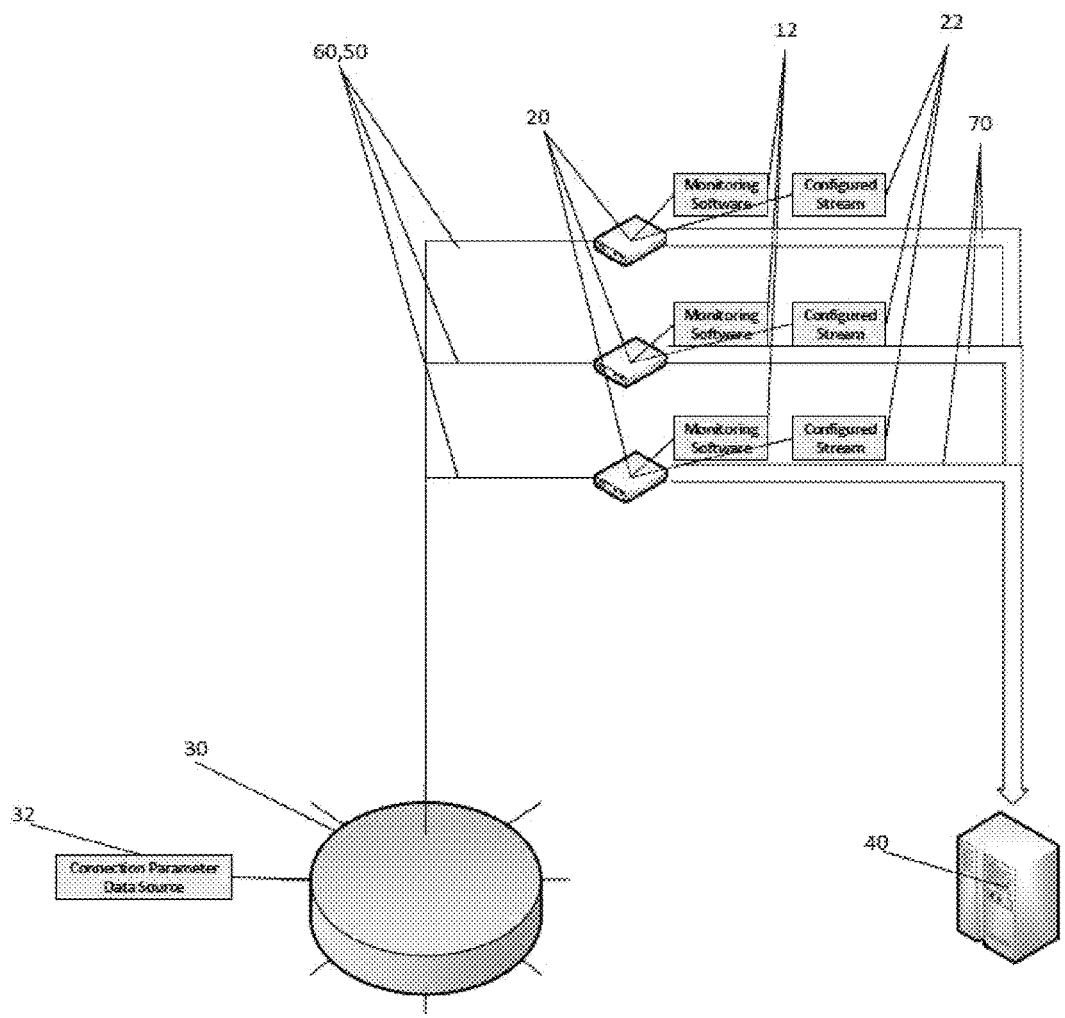
FIG. 2 illustrates the overall operation of the second mentioned embodiment of the digital media receiver monitoring system.

FIG. 2 shows the overall function of a second embodiment of the invention. Digital media source 30 sends digital media streams to active receivers 20 through digital media input 60. Monitoring software 12 on active receivers 20 uses data connection 50 to check upstream guide, channel map, system information or service information. Monitoring software 12 uses updated connection parameters to determine if active receiver 20 needs to re-connect to continue receiving the configured stream 22. Active receivers 20 output content through output medium 70 to content monitoring server 40.

Figure 3:
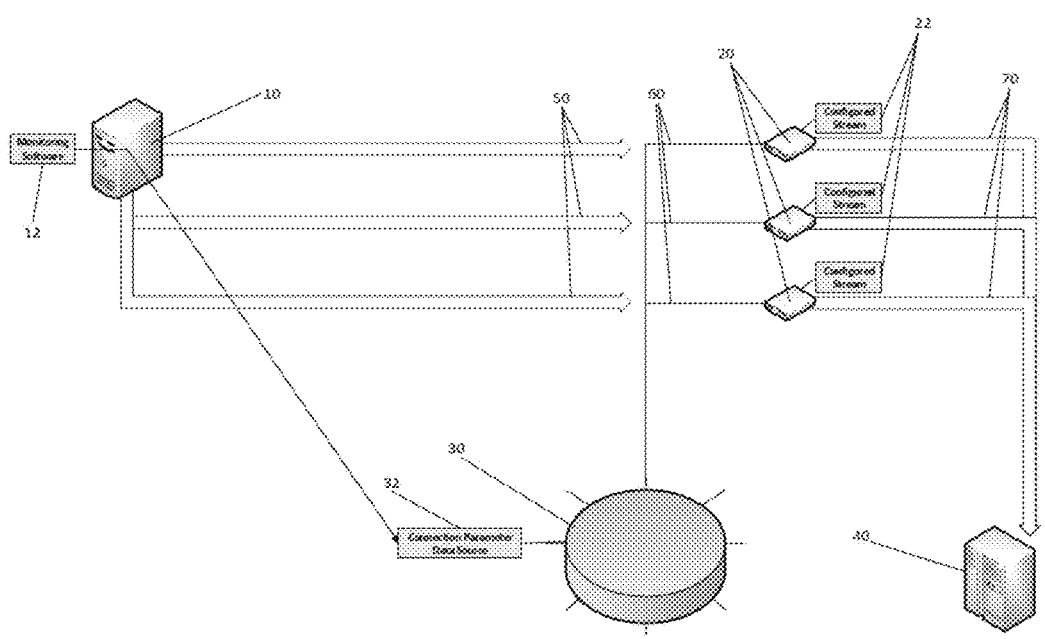
FIG. 3 illustrates the overall operation of the third mentioned embodiment of the digital media receiver monitoring system.

FIG. 3 shows the overall function of a third embodiment of the invention. This embodiment is the same as the embodiment described in FIG. 1 except that auditing receiver 80 has been eliminated and server for receiver monitoring 10 connects directly to connection parameter data source 32 and checks the current connection parameters for each configured stream 22 on each active receiver 20. While the invention has been particularly shown and described in specific embodiments thereof, it will be understood by those skilled in the art that various changes in form and details may be made therein without departing from the spirit and scope of the invention.

I claim:

1. A method for monitoring one or more active receivers, the method comprising:
    providing one or more active receivers with connection parameters, wherein the one or more active receivers receive a digital media input and provide a predetermined configured stream selected from the digital media input;
    providing a monitoring server for communicating with the one or more active receivers;
    providing an auditing receiver for querying a connection parameter data source for current required connection parameters for each of the one or more active receivers;
    wherein the monitoring server repeatedly communicates with the auditing receiver to query the current required connection parameters for each of the one or more active receivers and compares the current required connection parameters to the connection parameters for each of a corresponding one or more active receivers for determining if re-connection of any of the one or more active receivers is necessary to continue providing the predetermined configured stream, wherein connection parameters and current required connection parameters include information required to select a predetermined configured stream from the digital media input; and sending a command to re-connect from the monitoring server to the corresponding one of the one or more active receivers if the current required connection parameters do not match the connection parameters.

2. The method of claim 1, wherein the digital media input is from a cable TV service.

3. The method of claim 1, wherein the digital media input is from an over-the-air broadcast service.

4. The method of claim 1, wherein the digital media input is from an internet streaming service.

5. The method of claim 1 wherein the digital media input is from an IPTV service.

6. The method of claim 1, wherein the digital media input is from a satellite TV service.

7. The method of claim 1, and further comprising receiving from the connection parameter data source the current required connection parameters at the one or more active receivers and re-connecting to reestablish the configured stream in response to a command signal from the monitoring server.

8. The method of claim 1, wherein the connection parameters and current required connection parameters include radio frequency channel or packet identifiers.

9. The method of claim 1, wherein the one or more active receivers receive a digital media input and provide a predetermined configured stream selected from the digital media input to the monitoring server.

10. The method of claim 9, wherein each of the one or more active receivers receives a digital media input from a separate and distinct content provider comprising a digital media source providing a digital media input and a connection parameter data source for providing a virtual channel map with current required connection parameters; and wherein the monitoring server is separate and distinct from the content provider; and wherein the auditing receiver is separate and distinct from the content provider.

11. A method for monitoring one or more active receivers, the method comprising:
providing one or more active receivers, wherein the one or more active receivers each comprise connection parameters and each receive a digital media stream and provide a predetermined configured stream;
providing the predetermined configured stream predetermined for each of said one or more active receivers;
wherein each of the one or more active receivers repeatedly checks a connection parameter data source for current required connection parameters and compares the connection parameters with the current required connection parameters to determine if re-connecting is necessary to continue providing the predetermined configured stream, wherein connection parameters and current required connection parameters include information required to select a predetermined configured stream from the digital media input; and
re-connecting the one or more active receivers if the current required connection parameters do not match the connection parameters.

12. The method of claim 11, wherein the digital media input is from a cable TV service.

13. The method of claim 11, wherein the digital media input is from an over-the-air broadcast service.

14. The method of claim 11, wherein the digital media input is from an Internet streaming service.

15. The method of claim 11, wherein the digital media input is from an IPTV service.

16. The method of claim 11, wherein the digital media input is from a satellite TV service.

17. A method for monitoring one or more active receivers, the method comprising:
providing one or more active receivers, wherein each comprise connection parameters and each of the one or more active receivers receive a digital media stream and provide a predetermined configured stream selected from the digital media stream;
providing a monitoring server for communicating with the one or more active receivers;
providing from a connection parameter data source that is separate and distinct from the monitoring server current required connection parameters to the one or more active receivers and to the monitoring server; and
wherein said monitoring server repeatedly queries the connection parameter data source for the current required connection parameters and compares the connection parameters to the current required connection parameters for each of the one or more active receivers for determining if re-connecting is necessary to continue providing the predetermined configured stream, wherein connection parameters and current required connection parameters include information necessary to select the predetermined configured stream from the digital media input; and
sending a command to re-connect from the monitoring server to a corresponding one of the one or more active receivers if the current required connection parameters do not match the connection parameters.

18. The method of claim 17, wherein digital media input is from a cable TV service.

19. The method of claim 17, wherein the digital media input is from an over-the-air broadcast service.

20. The method of claim 17, wherein the digital media input is from an internee streaming service.

21. The method of claim 17, wherein the digital media input is from an IPTV service.

22. The method of claim 17, wherein the digital media input is from a satellite TV service.

23. A media monitoring system comprising:
at least one active receiver with connection parameters, where in the at least one active receiver receives a digital media stream from a digital media source and provides a configured stream selected from the digital media stream;
an auditing receiver for querying a connection parameter data source for current required connection parameters for the at least one active receiver; and
a monitoring server for receiving the configured stream from the at least one active receiver and for querying the current required connection parameters for the at least one active receiver and comparing the current required connection parameters with the connection parameters to determine if a change has been made and in response to a change sending a command to the at least one active receiver to re-connect.

24. The media monitoring system of claim 23, wherein the monitoring, server is housed with the at least one active receiver.

25. The media monitoring system of claim 23, wherein the auditing receiver is housed with the monitoring server.

26. The media monitoring system of claim 23, wherein connection parameters and current required connection parameters include radio frequency channel or packet identifiers.

* * * * *